US012173621B2

(12) United States Patent
Dube et al.

(10) Patent No.: US 12,173,621 B2
(45) Date of Patent: Dec. 24, 2024

(54) HYBRID PLATFORM MANUFACTURING

(71) Applicant: RTX Corporation, Farmington, CT (US)

(72) Inventors: Bryan P. Dube, Columbia, CT (US); Joshua S. Lieberman, Jupiter, FL (US)

(73) Assignee: RTX CORPORATION, Farmington, CT (US)

( * ) Notice: Subject to any disclaimer, the term of this patent is extended or adjusted under 35 U.S.C. 154(b) by 28 days.

(21) Appl. No.: 17/339,567

(22) Filed: Jun. 4, 2021

(65) Prior Publication Data

US 2022/0389823 A1 Dec. 8, 2022

(51) Int. Cl.
*F01D 5/28* (2006.01)
*F01D 9/04* (2006.01)

(52) U.S. Cl.
CPC ............ *F01D 5/284* (2013.01); *F01D 9/041* (2013.01); *F05D 2220/32* (2013.01); *F05D 2230/31* (2013.01); *F05D 2230/60* (2013.01); *F05D 2240/12* (2013.01); *F05D 2240/30* (2013.01)

(58) Field of Classification Search
CPC .. F01D 5/282; F01D 9/041; F05D 2300/6033; F05D 2240/30; F05D 2240/12; F05D 2230/60; F05D 2230/31; F05D 2220/32
See application file for complete search history.

(56) References Cited

U.S. PATENT DOCUMENTS

| | | | | |
|---|---|---|---|---|
| 7,427,428 | B1 * | 9/2008 | DiCarlo | C04B 35/62871 427/376.6 |
| 8,100,653 | B2 * | 1/2012 | Gerakis | F01D 5/284 416/96 A |
| 8,231,354 | B2 * | 7/2012 | Campbell | F01D 5/147 416/193 A |
| 10,329,201 | B2 | 6/2019 | Steibel et al. | |
| 10,737,986 | B2 * | 8/2020 | Roberts | C04B 37/003 |
| 10,774,008 | B2 | 9/2020 | Subramanian et al. | |
| 10,934,870 | B2 | 3/2021 | Whittle et al. | |
| 2013/0167374 | A1 * | 7/2013 | Kirby | H04W 4/023 428/317.9 |

(Continued)

OTHER PUBLICATIONS

Search Report issued for European Patent Application No. 22175957.4; Application Filing Date May 27, 2022; Date of Mailing Nov. 2, 2022 (7 pages).

*Primary Examiner* — Courtney D Heinle
*Assistant Examiner* — Andrew Thanh Bui
(74) *Attorney, Agent, or Firm* — CANTOR COLBURN LLP

(57) ABSTRACT

A method of assembling a ceramic matrix composite (CMC) component is provided. The method includes assessing which portions of the CMC component require relatively high-temperature capability and which portions require at least one of strength, thickness and increased thermal conductivity, making the portions that require the relatively high temperature capability with chemical vapor infiltration (CVI), making the portions that require the at least one of strength, thickness and increased thermal conductivity with melt infiltration (MI) and combining the portions that require the relatively high temperature capability with the CVI and the portions that require the at least one of strength, thickness and increased thermal conductivity with the MI.

9 Claims, 4 Drawing Sheets

(56) References Cited

U.S. PATENT DOCUMENTS

| | | | | |
|---|---|---|---|---|
| 2019/0040742 | A1* | 2/2019 | Roberts | F01D 5/005 |
| 2019/0084891 | A1* | 3/2019 | Steibel | F01D 5/284 |
| 2019/0084892 | A1 | 3/2019 | Subramanian et al. | |
| 2020/0088050 | A1* | 3/2020 | Whittle | F01D 5/282 |

* cited by examiner

HYBRID PLATFORM MANUFACTURING

BACKGROUND

The present disclosure relates to the formation of certain gas turbine engine components and, more particularly, to a hybrid platform manufacturing method for gas turbine engine components.

Creating ceramic matrix composite (CMC) hardware is typically a relatively long process. This process for a given CMC part can begin with preforming of the CMC part, which is followed by interface coating (IFC) processing. Next, the CMC part is subject to chemical vapor infiltration (CVI) processing to densify the CMC part. In addition, the CMC part creation process can include a leveraging of melt infiltration (MI) processing by creating MI processed platform flange inserts. It is often the goal to manage these and other stages in multiple phases as such management tends to create better CMC parts.

CMC parts that are formed by way of CVI tend to be porous, with voids and cavities that lead to less thermal conductivity.

Accordingly, an improved method of creating CMC parts is needed.

BRIEF DESCRIPTION

According to an aspect of the disclosure, a method of assembling a ceramic matrix composite (CMC) component is provided. The method includes assessing which portions of the CMC component require relatively high-temperature capability and which portions require at least one of strength, thickness and increased thermal conductivity, making the portions that require the relatively high temperature capability with chemical vapor infiltration (CVI), making the portions that require the at least one of strength, thickness and increased thermal conductivity with melt infiltration (MI) and combining the portions that require the relatively high temperature capability with the CVI and the portions that require the at least one of strength, thickness and increased thermal conductivity with the MI.

In accordance with additional or alternative embodiments, the CMC component includes a turbine blade or vane.

In accordance with additional or alternative embodiments, the turbine blade or vane includes a platform and an airfoil section.

In accordance with additional or alternative embodiments, the portions that require the relatively high temperature capability include the airfoil section.

In accordance with additional or alternative embodiments, the portions that require the relatively high temperature capability include external parts of the platform and the portions that require the at least one of strength, thickness and increased thermal conductivity include internal parts of the platform.

In accordance with additional or alternative embodiments, the external parts of the platform include gas path facing surfaces.

In accordance with additional or alternative embodiments, the gas path facing surfaces have a minimum thickness of about 0.005 inches (0.0127 mm).

In accordance with additional or alternative embodiments, the internal parts of the platform include radial flanges.

In accordance with additional or alternative embodiments, the internal parts of the platform are T-shaped.

In accordance with additional or alternative embodiments, the combining includes mechanically fitting together the portions that require the relatively high temperature capability and the portions that require the at least one of strength, thickness and increased thermal conductivity.

In accordance with additional or alternative embodiments, the combining includes sliding the portions that require the at least one of strength, thickness and increased thermal conductivity into the portions that require the relatively high temperature capability.

According to an aspect of the disclosure, a method of assembling a ceramic matrix composite (CMC) turbine blade or vane is provided. The method includes forming internal parts of a platform using melt infiltration (MI), forming external parts of the platform and an airfoil section using chemical vapor infiltration (CVI) and mechanically fitting the internal parts of the platform with the external parts of the platform.

In accordance with additional or alternative embodiments, the external parts of the platform include gas path facing surfaces.

In accordance with additional or alternative embodiments, the gas path facing surfaces have a minimum thickness of about 0.005 inches (0.0127 mm).

In accordance with additional or alternative embodiments, the internal parts of the platform include radial flanges.

In accordance with additional or alternative embodiments, the internal parts of the platform are T-shaped.

In accordance with additional or alternative embodiments, the internal parts of the platform are slidable relative to the external parts of the platform.

According to an aspect of the disclosure, a ceramic matrix composite (CMC) turbine blade or vane is provided. The CMC turbine blade or vane includes a platform including external parts and internal parts mechanically fit with the external parts and an airfoil section disposed with the platform. The external parts of the platform and the airfoil section are formed from chemical vapor infiltration (CVI) and the internal parts of the platform are formed from melt infiltration (MI).

In accordance with additional or alternative embodiments, the external parts of the platform include gas path facing surfaces having a minimum thickness of about 0.005 inches (0.0127 mm).

In accordance with additional or alternative embodiments, the internal parts of the platform are T-shaped and include radial flanges.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As noted above, CMC parts formed with CVI can exhibit limitations on cold side features where added thickness for strength is often needed. Particularly, CMC parts with flanges that carry vane aerodynamic loads are especially difficult to manufacture with CVI and achieve structural needs. Thus, as will be described below, a CMC component is manufactured in a piecemeal manner with CVI and MI portions where the CVI portions are built in different manners from the MI portions. For example, the airfoil portion of a vane and certain portions of platforms could be made via CVI but other portions of the platforms would be made with MI. This hybrid scheme will reap the benefits of each process for maximum CMC component capability.

A detailed description of one or more embodiments of the disclosed apparatus and method are presented herein by way of exemplification and not limitation with reference to the Figures.

Figure 1:
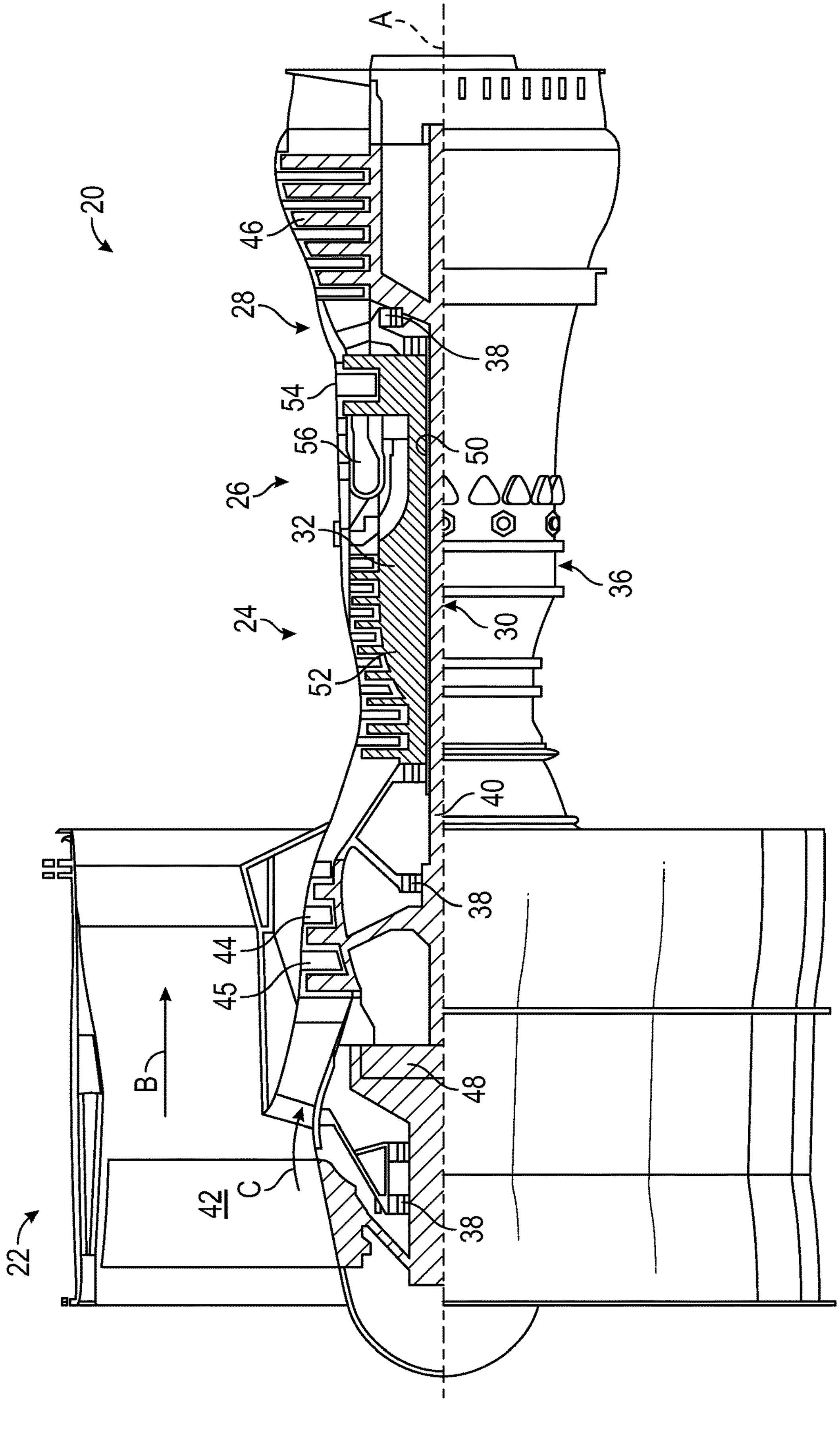
FIG. 1 is a partial cross-sectional view of a gas turbine engine in accordance with embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °\text{R})/(518.7°\text{R})]^{0.5}$. The "Low corrected fan tip speed" as disclosed herein according to one non-limiting embodiment is less than about 1150 ft/second (350.5 m/sec).

Figure 2:
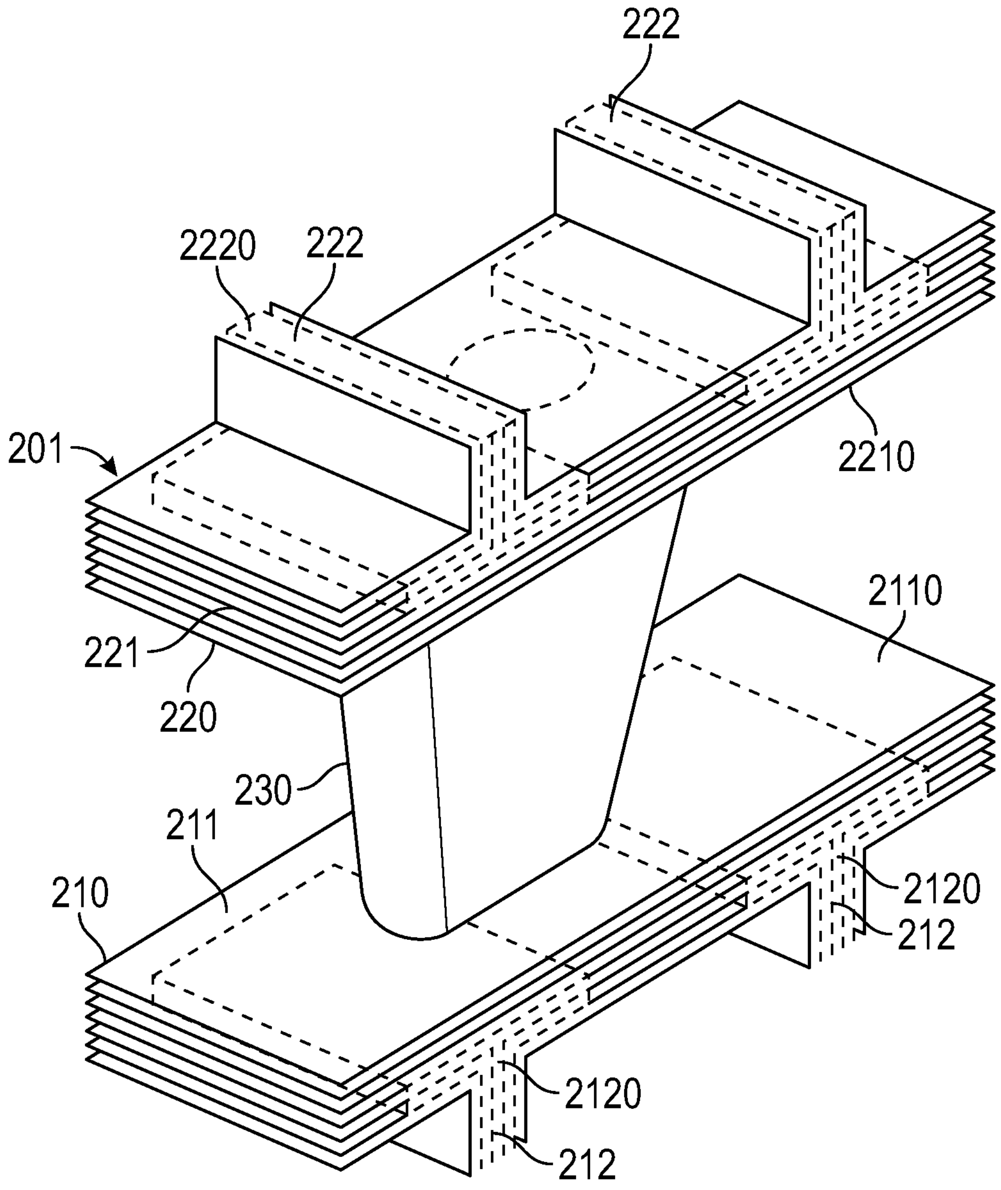
FIG. 2 is a perspective view of a CMC turbine blade or vane in accordance with embodiments.

With reference to FIG. 2, a ceramic matrix composite (CMC) turbine blade or vane 201 is provided. The CMC turbine blade or vane includes an inner platform 210, an outer platform 220 and an airfoil section 230 interposed between the inner platform 210 and the outer platform 220. The inner platform 210 includes external parts 211 and internal parts 212 that are mechanically fittable with or slidable relative to the external parts 211. The outer platform 220 includes external parts 221 and internal parts 222 that are mechanically fittable with or slidable relative to the external parts 221. The airfoil section 230 includes leading and trailing edges and pressure and suction surfaces extending between the leading and trailing edges. In accordance with embodiments, the external parts 211 and 221 include gas path facing surfaces 2110 and 2210 and have a minimum thickness of about 0.005 inches (0.0127 mm). The internal parts 212 and 222 are T-shaped and include radial flanges 2120 and 2220.

While the CMC turbine blade or vane 201 has been described as having the inner platform 210 and the outer platform 220, it is to be understood that this is not required and that other embodiments exist. As an example, the CMC turbine blade or vane 201 may not have an outer platform 220 in which case the airfoil section 230 can be disposed with the inner platform 210. For purposes of clarity and brevity, however, the following description will relate to the case in which the CMC turbine blade or vane 201 has both the inner platform 210 and the outer platform 220 with the airfoil section 230 interposed between the inner platform 210 and the outer platform 220.

With the construction described above, the external parts 211 and 221 and the airfoil section 230 can be exposed to high temperature and high pressure fluids (i.e., during an operation of a gas turbine engine in which the CMC turbine blade or vane 201 is installed). As such, the external parts 211 and 221 and the airfoil section 230 are designed for high temperature capabilities and are therefore formed from CVI processing. By contrast, the internal parts 212 and 222 do not come into contact with the high temperature and high pressure fluids but do absorb loads of the CMC turbine blade or vane 201. Therefore, the internal parts 212 and 222 are formed from MI processing.

Figure 3:
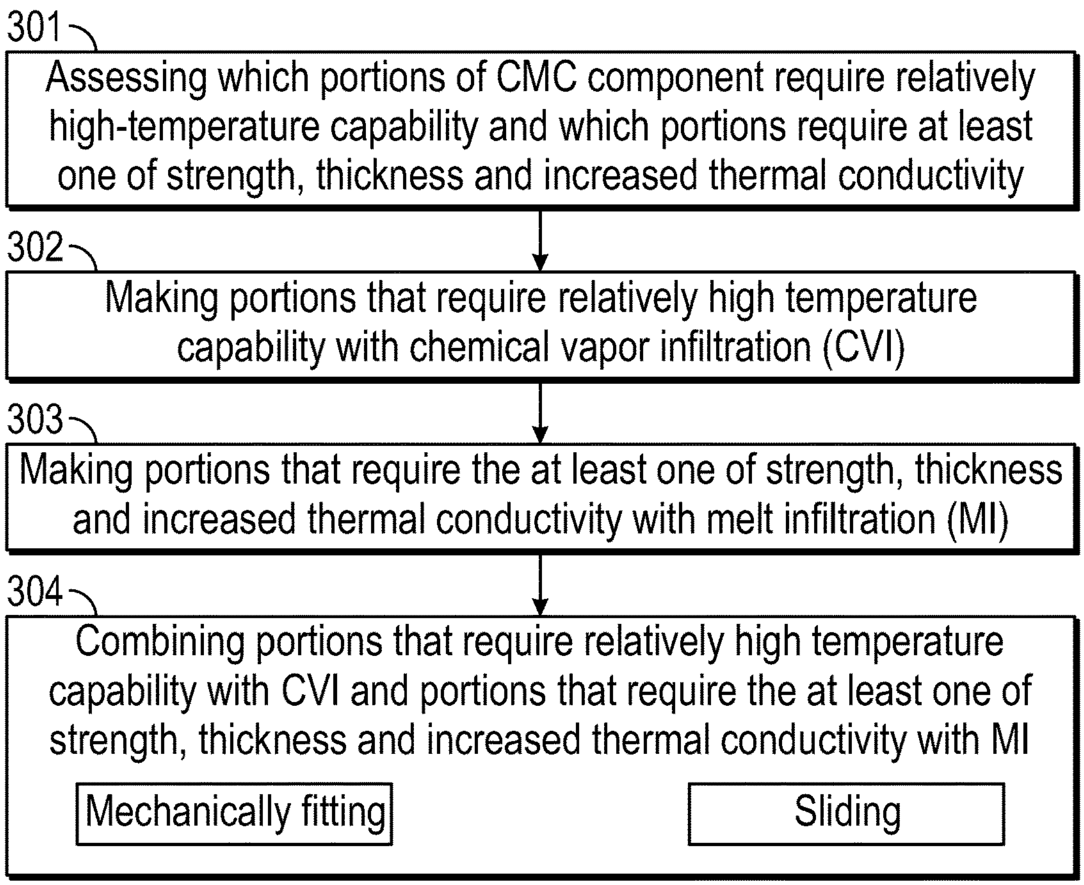
FIG. 3 is a flow diagram illustrating a method of assembling a CMC turbine blade or vane in accordance with embodiments.

With reference to FIG. 3, a method of assembling a CMC component is provided. As shown in FIG. 3, the method includes assessing which portions of the CMC component require relatively high-temperature capability and which portions require at least one of strength, thickness and increased thermal conductivity 301, making the portions that require the relatively high temperature capability with chemical vapor infiltration (CVI) 302, making the portions that require the at least one of strength, thickness and increased thermal conductivity with melt infiltration (MI) 303 and combining the portions that require the relatively high temperature capability with the CVI and the portions that require the at least one of strength, thickness and increased thermal conductivity with the MI 304. The combining of operation 304 includes at least one of mechanically fitting together the portions that require the relatively high temperature capability and the portions that require the at least one of strength, thickness and increased thermal conductivity and sliding the portions that require the at least one of strength, thickness and increased thermal conductivity into the portions that require the relatively high temperature capability.

In accordance with embodiments, the CMC component includes a turbine blade or vane that includes an inner platform, an outer platform and an airfoil section interposed between the inner and outer platforms. The portions that require the relatively high temperature capability include the airfoil section and external parts of the inner and outer platforms and the portions that require the at least one of strength, thickness and increased thermal conductivity include internal parts of the inner and outer platforms. The external parts of the inner and outer platforms include gas path facing surfaces and can have a minimum thickness of about 0.005 inches (0.0127 mm). The internal parts of the inner and outer platforms include radial flanges and are T-shaped.

Figure 4:
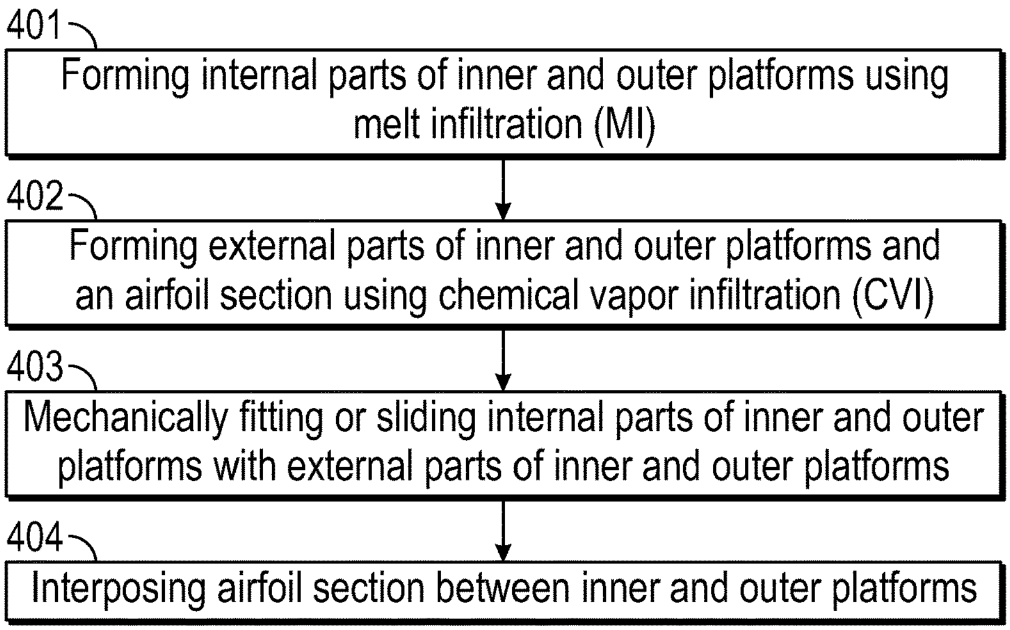
FIG. 4 is a flow diagram illustrating a method of assembling a CMC turbine blade or vane in accordance with embodiments.

With reference to FIG. 4, a method of assembling a CMC turbine blade or vane is provided. As shown in FIG. 4, the method includes forming internal parts of inner and outer platforms using melt infiltration (MI) 401, forming external parts of the inner and outer platforms and an airfoil section using chemical vapor infiltration (CVI) 402, mechanically fitting or sliding the internal parts of the inner and outer platforms with the external parts of the inner and outer platforms 403 and interposing the airfoil section between the inner and outer platforms 404. Regarding the interposing of the airfoil section between the inner and outer platforms of operation 404, it is to be understood that the airfoil section can be formed monolithically or integrally with portions of the inner and outer platforms in some embodiments. In these or other cases, the airfoil section is effectively interposed between the inner and outer platforms.

In accordance with embodiments, the external parts of the inner and outer platforms include gas path facing surfaces having a minimum thickness of about 0.005 inches (0.0127 mm) and the internal parts of the inner and outer platforms include radial flanges and are T-shaped and are slidable relative to the external parts of the inner and outer platforms.

In accordance with embodiments, at least the internal parts of the inner and outer platforms can have thermal conductivity properties of about 60 BTU-in/h-$ft^2$-F.

Figure 5:
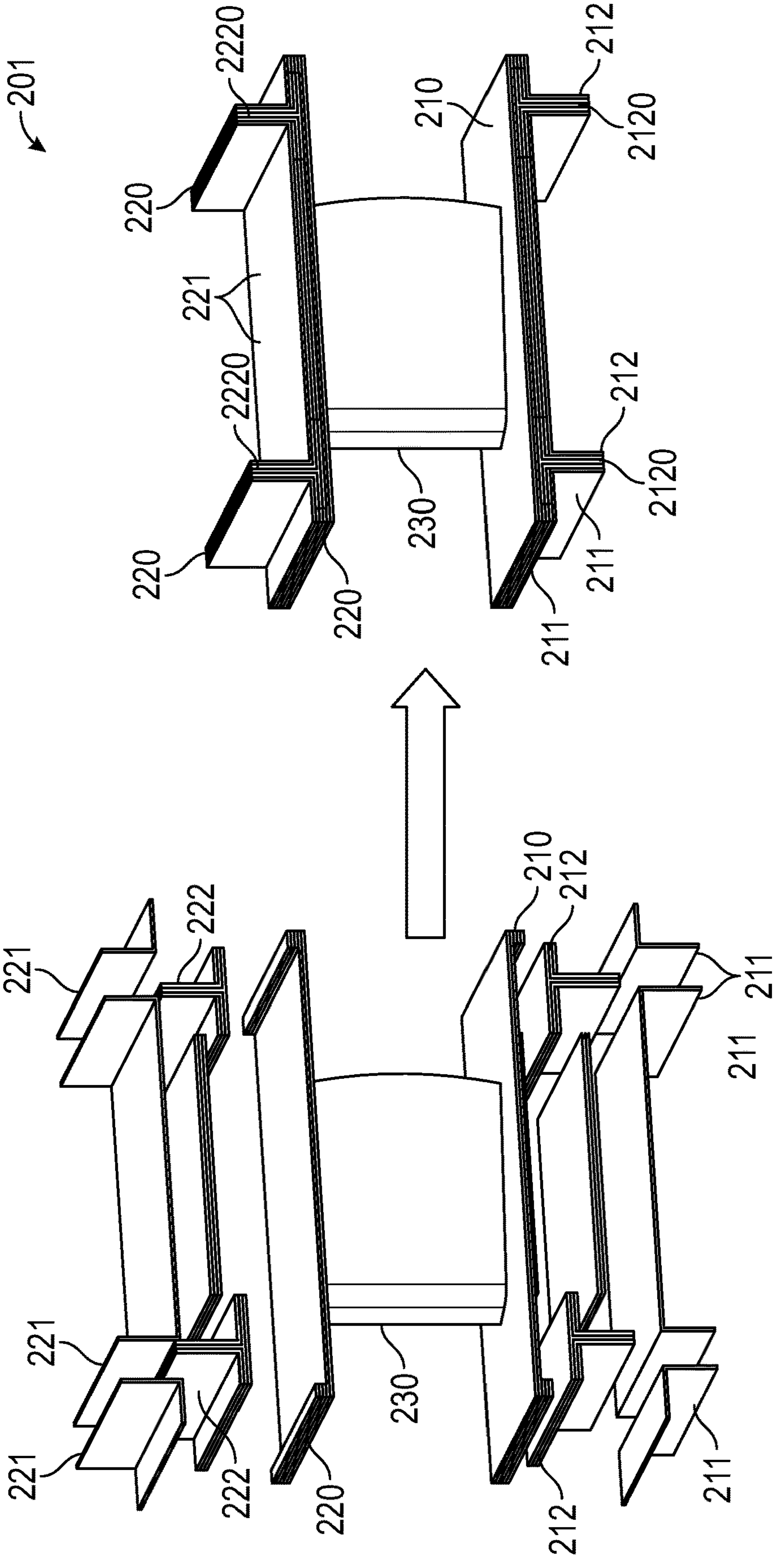
FIG. 5 illustrates exploded and assembled views of the CMC turbine blade in accordance with embodiments.

With reference back to FIG. 2 and with additional reference to FIG. 5, exploded and assembled views of the CMC turbine blade or vane 201 of FIG. 2 are illustrated in greater detail. As shown in FIG. 5, the external parts 211 and 221 and the airfoil section 230 are formed from CVI as a CVI preform while the internal parts 212 and 222 are formed from MI. The internal parts 212 and 222 are then assembled with the external parts 211 and 221 and the airfoil section 230 of the CVI preform into the CMC turbine blade or vane 201. The assembly of the internal parts 212 and 222 with the external parts 211 and 221 and the airfoil section 230 can be accomplished by sliding adjacent parts together as shown in FIG. 5.

Technical effects and benefits of the present disclosure are the provision of methods of manufacturing designed to create improved durability in CMC components. This is accomplished by leveraging manufacturing techniques that are most ideal for certain features of CMC components.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A method of assembling a ceramic matrix composite (CMC) component, the method comprising:
   assessing which portions of the CMC component require relatively high-temperature capability and which portions require at least one of strength, thickness and increased thermal conductivity;
   making the portions that require the relatively high temperature capability with chemical vapor infiltration (CVI);
   making the portions that require the at least one of strength, thickness and increased thermal conductivity with melt infiltration (MI); and
   combining the portions that require the relatively high temperature capability with the CVI and the portions that require the at least one of strength, thickness and increased thermal conductivity with the MI by sliding the portions that require the at least one of strength, thickness and increased thermal conductivity into the portions that require the relatively high temperature capability,
   wherein:
   the CMC component comprises a turbine blade or vane comprising a platform and an airfoil section,
   the portions that require the relatively high temperature capability comprise external parts of the platform comprising a first part with a flat section and flanges at opposite ends thereof, a flat second part, a U-shaped part and opposite L-shaped parts,
   the portions that require the at least one of strength, thickness and increased thermal conductivity comprise internal parts of the platform which are each single T-shaped and comprise only a single cross bar and only a single radial flange connected to the single cross bar, and
   the sliding comprises:
      arranging the external parts of the platform to form T-shaped openings; and
      sliding each of the internal parts of the platform into a respective one of the T-shaped openings.

2. The method according to claim 1, wherein the portions that require the relatively high temperature capability comprise the airfoil section.

3. The method according to claim 1, wherein the external parts of the platform comprise gas path facing surfaces.

4. The method according to claim 3, wherein the gas path facing surfaces have a minimum thickness of about 0.005 inches (0.0127 mm).

5. A method of assembling a ceramic matrix composite (CMC) turbine blade or vane, the method comprising:
   forming internal parts of a platform using melt infiltration (MI);
   forming external parts of the platform and an airfoil section using chemical vapor infiltration (CVI); and
   sliding the internal parts of the platform into the external parts of the platform,
   wherein:
   the external parts of the platform comprise a first part with a flat section and flanges at opposite ends thereof, a second flat part, a U-shaped part and opposite L-shaped parts,
   the internal parts of the platform are each single T-shaped and comprise only a single cross bar and only a single radial flange connected to the single cross bar, and
   the sliding comprises:
      arranging the external parts of the platform to form T-shaped openings; and
      sliding each of the internal parts of the platform into a corresponding one of the T-shaped openings.

6. The method of assembling the CMC turbine blade or vane according to claim 5, wherein the external parts of the platform comprise gas path facing surfaces.

7. The method of assembling the CMC turbine blade or vane according to claim 6, wherein the gas path facing surfaces have a minimum thickness of about 0.005 inches (0.0127 mm).

8. A ceramic matrix composite (CMC) turbine blade or vane, comprising:
   a platform comprising external parts and internal parts that are slidable into the external parts; and
   an airfoil section disposed with the platform, the external parts of the platform and the airfoil section being formed from chemical vapor infiltration (CVI) and the internal parts of the platform being formed from melt infiltration (MI),
   the internal parts of the platform are each single T-shaped, and
   the external parts of the platform comprise a first part with a flat section and flanges at opposite ends thereof, a second flat part, a U-shaped part and opposite L-shaped parts that cooperatively form single T-shaped openings into each one of which each of a corresponding one of the single T-shaped internal parts slides.

9. The CMC turbine blade or vane according to claim 8, wherein the external parts of the platform comprise gas path facing surfaces having a minimum thickness of about 0.005 inches (0.0127 mm).

* * * * *